(12) United States Patent
Gold

(10) Patent No.: US 6,935,348 B2
(45) Date of Patent: Aug. 30, 2005

(54) METHOD AND ASSEMBLY FOR INCREASING HAIR VOLUME

(75) Inventor: David Anthony Gold, Rome (IT)

(73) Assignee: Indorata Servicos E Gestao LDA, Funchal (PT)

(*) Notice: Subject to any disclaimer, the term of this patent is extended or adjusted under 35 U.S.C. 154(b) by 72 days.

(21) Appl. No.: 10/091,867

(22) Filed: Mar. 6, 2002

(65) Prior Publication Data

US 2002/0185146 A1 Dec. 12, 2002

(30) Foreign Application Priority Data

Jun. 7, 2001 (IT) .................................... RM2001A0317

(51) Int. Cl.⁷ ............................................... A41G 5/00
(52) U.S. Cl. ........................................ 132/53; 132/201
(58) Field of Search ........................... 132/201, 53, 54, 132/55, 56, 216, 275; 623/15.11; D28/92, 93

(56) References Cited

U.S. PATENT DOCUMENTS

| | | | | |
|---|---|---|---|---|
| 1,831,801 A | * | 11/1931 | Birk | 132/53 |
| 2,835,259 A | * | 5/1958 | Goodman | 132/53 |
| 2,862,509 A | * | 12/1958 | Porte | 132/53 |
| 3,295,534 A | * | 1/1967 | Dorkin | 132/201 |
| D207,145 S | * | 3/1967 | Aylott | D28/92 |
| 3,561,454 A | * | 2/1971 | O'Connell | 132/216 |
| 3,568,684 A | * | 3/1971 | Reece | 132/333 |
| 3,670,742 A | * | 6/1972 | Weaner | 132/216 |
| 3,727,619 A | | 4/1973 | Kuris | |
| 3,823,723 A | * | 7/1974 | Miller | 132/201 |
| 3,900,038 A | * | 8/1975 | Masters | 132/201 |
| 4,934,387 A | * | 6/1990 | Megna | 132/201 |
| 4,964,428 A | * | 10/1990 | Lamatrice | 132/216 |
| 4,993,988 A | * | 2/1991 | Chamberlain | 446/394 |
| 5,082,010 A | * | 1/1992 | Skaryd et al. | 132/201 |
| 5,107,867 A | * | 4/1992 | Barrington | 132/201 |
| 5,413,124 A | * | 5/1995 | Incando | 132/201 |
| 5,575,298 A | * | 11/1996 | Hinton | 132/200 |
| 5,868,145 A | * | 2/1999 | Spann | 132/201 |
| 5,894,846 A | * | 4/1999 | Gang | 132/201 |
| 6,109,274 A | * | 8/2000 | Ingersoll | 132/201 |
| 6,131,585 A | * | 10/2000 | Reinstein et al. | 132/275 |
| 6,135,122 A | | 10/2000 | Campbell et al. | |
| 6,405,736 B2 | * | 6/2002 | Townsend | 132/201 |
| 6,446,636 B1 | * | 9/2002 | Vittallo | 132/201 |
| 6,581,609 B2 | * | 6/2003 | Ott | 132/201 |
| 2001/0035192 A1 | | 11/2001 | Townsend | |
| 2001/0037813 A1 | * | 11/2001 | Ra | 132/53 |

FOREIGN PATENT DOCUMENTS

| | | |
|---|---|---|
| EP | 0 650 672 A1 | 5/1995 |
| GB | 2 288 976 | 11/1995 |

* cited by examiner

Primary Examiner—Kevin Shaver
Assistant Examiner—David Comstock
(74) Attorney, Agent, or Firm—Sonnenschein Nath & Rosenthal, LLP

(57) ABSTRACT

The invention relates to a method for increasing hair volume or length or adding a different color, including the steps of providing a plurality of extensions comprising several hairs, which are connected by a fixing element, the extensions being aligned and substantially in parallel with their fixing elements located on a support tape having an adhesive face, adhering the adhesive face of the support tape to head hair and positioning the extensions, and connecting the extensions with the head hair by attaching the fixing elements to it Further, the invention relates to an assembly and system for use in such method.

15 Claims, 7 Drawing Sheets

METHOD AND ASSEMBLY FOR INCREASING HAIR VOLUME

BACKGROUND OF THE INVENTION

The current invention relates to a method for increasing hair volume and to an assembly of hair extensions designed for use in this method.

Various systems are already known for increasing hair volume and also for lengthening hair. These systems in general use hair extensions, natural or artificial in nature, which are then fixed to the head hair using methods that, based on the proposed application methods, determine the acceptance and satisfaction on the part of the user who has requested such treatment.

Another aspect that helps to increase the satisfaction with such treatment is the speed of implementation.

The known systems include a phase in which the extensions are connected to the hair of the user. During this phase, the extensions can basically be sewn, bonded or knotted to the user's hair. However, these methods of extension require a period of time that is very long, considering that each single extension requires manual implementation and precision.

Other methods are known for creating a connection between the extensions and the hair, requiring the use of external elements such as clasps, combs, grips, etc. These elements can be used to attach extensions of larger dimensions to the user's hair, but have the great inconvenience that the connection is clearly visible and can be felt by the user who can feel uncomfortable with them.

Amongst other known methods, there are those that permit smaller dimensioned extensions to be connected to the hair. These methods, that require the use of adhesive, small clasping elements, etc. give fairly good results, but in all cases require long application sessions because the operator must connect each individual extension, none of which can be of larger dimensions as otherwise the connections would be visible to the user and the observer.

An example of this method is described in JP 03152205 (Aderans Co. Ltd.) and in other successive patents based on perfecting this technique. The inventor of the present invention has developed such methods and bondings for lengthening and thickening hair described in ZA 93/5214 A or in DE 196 26 107 C.

These documents describe extension elements and the relevant method of application where an extension is fixed to the head hair with the application of a thermoplastic adhesive. In this context, it is clear that application is manual and that it may not be uniform from extension to extension.

The forced manual implementation of these known methods therefore implies a series of problems. In the first case, the operator must have great experience and practice in this technique to be able to implement regular connections, a condition that is not always possible. In addition, apart from experience, it will be extremely difficult to produce uniform connections: they will vary greatly as they will not be positioned exactly along the lines proposed for the hair extension and will vary in quality and size.

All this means that the quality of the finished work will not be optimal, will be more exposed to wear, with imperfections that cannot be rectified, increased costs due to very long application times and the difficulty in locating experienced operators.

Similar difficulties are present with those methods using an adhesive applied to the connection being created, for example, in the method described in U.S. Pat. No. 4,934,387 (Megna).

SUMMARY OF THE INVENTION

An object of the invention is to provide a method of increasing hair volume and to provide an assembly of extensions designed to be used in this method which resolve the inconveniences mentioned with reference to the techniques noted.

This problem is resolved by a method as specified above, which comprises the following steps:

providing a plurality of extensions comprising several hairs, which are connected by a fixing element, said extensions being aligned and basically in parallel with their fixing elements located on a support tape having an adhesive face;

adhering the adhesive face of the support tape to head hair and positioning the extensions;

connecting the extensions with the head hair by attaching the fixing elements to it.

The solution idea comprises providing a method and an assembly for increasing hair volume with no manual intervention required and which allows the application of extensions in batches by applying several extensions in one step. The fixing elements connecting the hairs of each extension are usually called bondings.

The advantages of the method of the invention are:

Since several extensions are fixed to the head hair in only one step the application of the extensions is much faster than with the known method. A hair extension procedure in which about 200 extensions are applied takes at least two hours when done in the conventional way. With the method of the invention the same number of extensions may be applied in fifteen minutes or less. Therefore not only are costs reduced but also the customer's comfort is enhanced.

The procedure is much easier to perform since it is no longer necessary to roll individual bondings with the fingers so that the method of the invention may be performed not only by specialized and trained staff, but also by hair dressers after a short introduction. The likelihood of mistakes is minimized and the appearance of the result is much better. This is due to the fact that the bondings are applied regularly with equal separations. Further the bondings are completely flat and less visible. The head hair is not pulled in from the sides to fix a bonding as it is the case with known methods in which the hair is pulled out of the natural falling so that the head hair forms a small triangle with the apex in the bonding. With the method of the invention, the head hair remains essentially parallel so that the hair is not disturbed by the bondings and the natural appearance is maintained.

A further advantage of the invention is that it is possible to use smaller extensions, i.e., each extension contains a smaller number of hairs compared to the conventional method. Since it is possible to apply a larger number of extensions in a reasonable time, a finer distribution of the hair can be accomplished. The use of very small bondings is not possible with the conventional method since the thermal capacity would be too small, so that the bonding would cool down in a short time after removing a heating device and therefore the time for which the bonding is soft and tacky is too short for establishing a proper connection to the head hair, by rolling it with the fingers, for example.

The method of the invention is very safe since even though a hot instrument is used for melting the thermoplastic material of the bonding or on the bonding, it is possible to prevent the hot instrument from coming into contact with the hair or the head hair. Furthermore, a protection shield is no longer needed for protecting the customer when applying the extension.

There are two main embodiments of the method of the invention. In a first embodiment on the bondings or fixing elements connection means are located which are used to secure the extension on the head hair. Such connection means may comprise a drop of glue or hot melt adhesive, for example. Applying the extensions is especially easy if a glue is used which is activated by ambient air. In a second embodiment the fixing element itself is used as a connection means. In that case the fixing element itself is softened by application of heat or ultrasonic energy to establish connection to head hair, for example.

When the extensions are applied by means of heat, the connection means preferably comprises a thermoplastic material which softens when the heat is applied. After cooling down the connection means, the thermoplastic material is solidified and a secure connection is established.

Instead of applying heat directly, it can be applied as ultrasonic energy to the connection means. In this case a thermoplastic material softens due to heat and vibration produced by ultrasonic waves. The advantages of this procedure are that the head hair is less exposed to heat and that the method is fail safe.

Further, the invention relates to an assembly for increasing hair volume or length. In a first embodiment the assembly comprises:

a support tape having an adhesive face;

a plurality of extensions, comprising several hairs, which are connected by a fixing element, said extensions being aligned and basically in parallel with their fixing elements located on the support tape;

connecting means which are provided on the fixing elements to connect the extensions to head hair.

In a second embodiment the invention comprises:

a support tape having an adhesive face;

several extensions, comprising several hairs, which are connected by a fixing element, said extensions being aligned and basically in parallel with their fixing elements located on the support tape, said fixing elements being connecting means to connect the extensions to head hair.

The principal advantage of this method and the assembly of extensions resides, according to the present invention, in allowing the rapid application of a high number of extensions in a single step, implementing contemporaneously a corresponding number of connections with very small dimensions and therefore almost invisible and not detectable by the user.

In a further variant of the invention the extension comprises hair of a color different to that of the head hair. In that way highlights or lowlights can be realized much easier than by conventional methods in which single strands of head hair are colored.

In a preferred embodiment of the invention the fixing elements comprise plates having at least layers of plastic with different melting points. So it is possible to be sure that only a part of the fixing elements will be softened when treated with heat or ultrasonic energy.

Further, the invention relates to a method for adding at least one of highlights and low lights to head hair, comprising the following steps:

providing a plurality of extensions comprising several hairs, at least some of which have a color different than a color of the head hair, which plurality of extensions are connected by a fixing element, said extensions being aligned and substantially parallel with their fixing elements located on a support tape having an adhesive face;

adhering the adhesive face of the support tape to head hair and positioning the extensions;

connecting the extensions with the head hair by attaching the fixing elements to the head hair.

Typical known techniques for applying highlights and low lights, which include chemical treatments such as bleaching and dyeing are no longer needed with this method.

Further the invention relates to a system for use in increasing hair volume or length, comprising:

a support tape having an adhesive face;

a plurality of extensions, comprising several hairs, which are connected by a fixing element, said extension being aligned and substantially parallel with their fixing elements located on the support tape;

connecting means associated with the fixing elements to connect the extensions to head hair; and a gripper device for applying at least one of mechanical energy, heat and ultrasonic energy via at least one of two pressure elements which are elongated to apply a uniform pressure along a length of the tape.

BRIEF DESCRIPTION OF THE DRAWINGS

The current invention will now be described according to the various forms of preferred implementation provided as examples but not limited by reference to the appended drawings, in which.

DETAILED DESCRIPTION OF THE PREFERRED EMBODIMENTS

Figure 1:
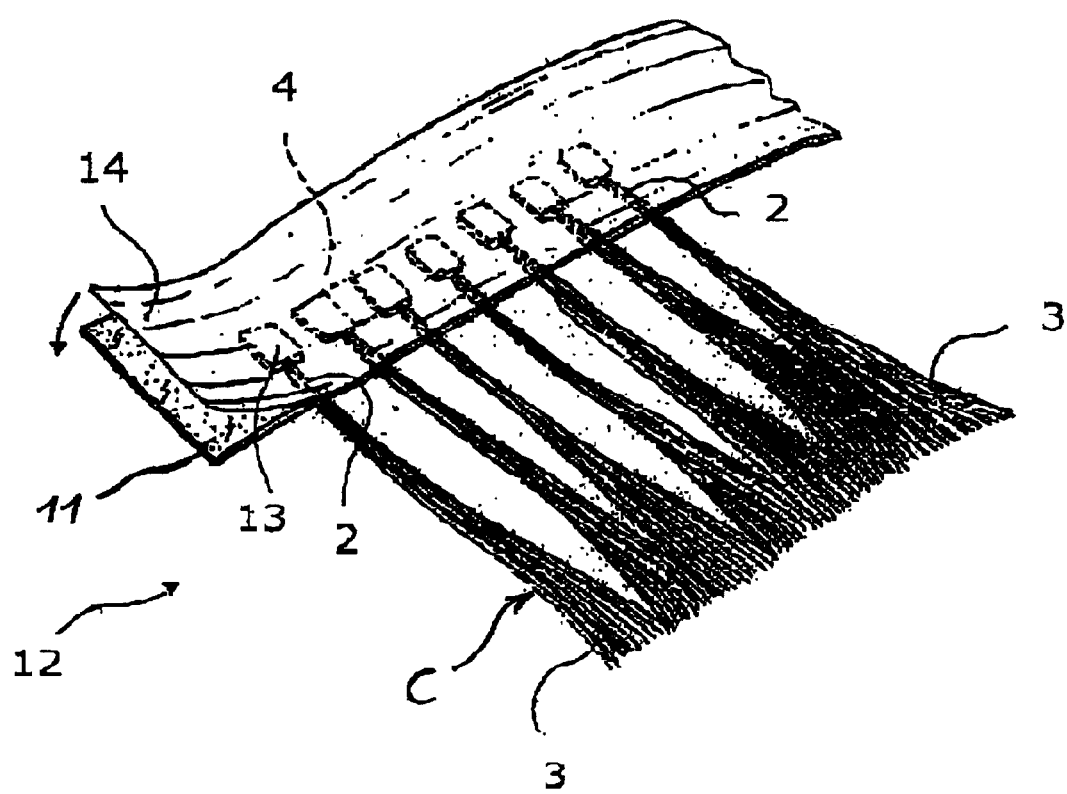
FIG. 1 represents a perspective view of an assembly of strands according to the invention.
Figure 2:
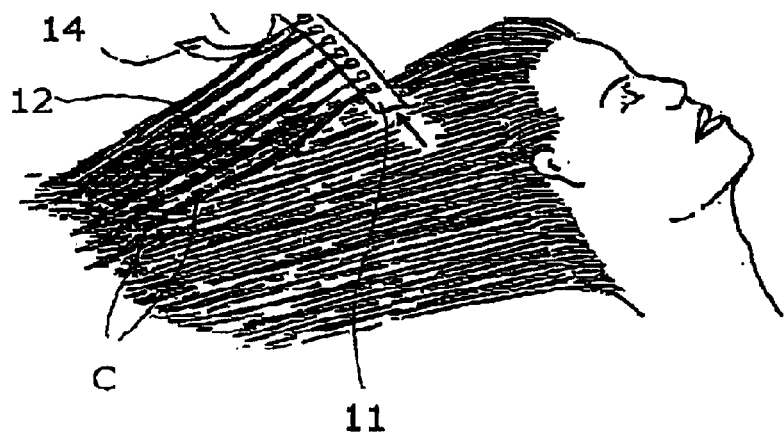
FIGS. 2 to 6 schematically illustrate, using perspective views, various phases of a method for increasing hair volume according to the current invention, implemented with an assembly of extensions according to the invention.

With reference to FIG. 1, an assembly 12 of extensions C, according to an initial example for implementing the invention, comprises a number of extensions C, aligned and basically in parallel, comprises a quantity of substantially predefined hairs 3 which can be natural or artificial, with appropriately selected colors, uniform or streaked.

The extensions C are arranged substantially equidistant. They extend from their respective proximal extremities 2, designed to be connected to the head hair, to the free distal extremities. The extensions C and the respective hairs 3 have a length that is preferably uniform.

Together with the aforesaid proximal extremities 2, the assembly 12 includes, on each extension C, a fixing element 13 produced from a thermoplastic material such as polyamide, polyester or even a polyurethane, for example, nylon.

To connect the fixing element 13 to the respective extremities 2, various systems can be used, including hot gluing, injection, etc., which are well known in the art.

The fixing element 13 has the form of a small rectangle or disk with a width (exaggerated in the drawings) substantially equal to or only slightly larger than that of the respective extension C. The same applies to the thickness, to limit to a minimum the quantity of thermoplastic material that, as described below, acts as the adhesive.

The assembly 12 also includes a support tape 11, made of a transparent material with an adhesive face 4 on which the fixing elements 13 are positioned.

The material forming the support tape 11 is preferably, but not exclusively, made of a material resistant to heat. The adhesive used is a non-permanent and reversible type, operated by pressure. Its adhesive force on the tape 11 is greater than that produced on the thermoplastic material that forms the fixing elements 13 so that a subsequent separation of the tape 11 from this material does not leave any adhesive residues.

The aforesaid adhesive face 4 can be covered with a protective tape 14 (FIG. 1) to facilitate production and storage of the assembly 12.

In this production example, the assembly 12 comprises means for connecting extensions C to head hair T that comprise the fixing elements 13 themselves as shown in the description of the hair extension method that follows.

The support tape 11 can have a defined length and hold a predetermined number of extensions C or it can have an undefined length so that the operator can cut sections to select the desired number of extensions C.

In all cases, the operator can eliminate one or more extensions that are not compatible with the application being carried out by simply cutting away a section of tape 11.

On each assembly 12, the extensions C can be of the same length, size and color, but it is also possible to have variations in length to produce scaled increases, variations in color to produce complex streaks and variations in size.

The covering and protective tape 14 can also be adhesive and/or transparent and can also be made of normal silicone-coated paper.

Still based on the current example, the thermoplastic material can be a substance suitable for being fused at a temperature above ambient, assuming the properties of a plastic fluid, and then cooling and solidifying at ambient temperature.

Substances with analogous properties can be fused using the direct application of mechanical energy, in the form of high frequency vibrations, in particular, ultrasonic vibrations. In this case, the intermolecular vibrations and the resulting friction generate the quantity of heat necessary to plastically move the molecules with respect to each other. The generation of heat stops when the vibrations cease, resulting in almost immediate solidification.

Examples of substances that can be used as a thermoplastic material are polyesters, polyamides, polyurethanes, etc.

The function of the fixing element 13 according to the current invention is that of holding together the hairs in each extension C and that of providing the attachment point of the extension C to the hair of the head hair T being extended.

Other examples of fixing elements 13 include plastic elements, in the form of disks or balls to which the hair of the extension is fixed. These fixing elements 13 are associated with means of connections, for example, comprising portions of a thermoplastic material as already described or glues and/or adhesives of another nature: pressure hardening, thermosetting, thermo-shrinking, etc. Such examples will be described below.

The fixing element 13, which can have a color compatible with the hair of the extension C, can also be embellished with additional decorative elements such as artificial gems, crystals, etc.

All the fixing elements and their variations described above are suitable for the hair extension methods described below.

With reference to FIGS. 2 to 6, the extension method using the assembly described above proceeds with the following steps.

The extension assembly is prepared, the protective tape 14 is removed if present. In this configuration, the extensions C are positioned in an ordered alignment; the support tape 11 can be adhered to the hair T being extended. The operator can utilize the adhesive face of tape 11 and its transparency to check the effect produced on the hair being extended before fixing it in place. The user can also check the effect by means of a mirror.

Subsequently, once the position of the tape 11 and the extension C has been decided on, the next phase occurs in which the fixing element 13 is connected to the hair of the user. In this phase, the operator activates the means of connection described above.

Figure 3:
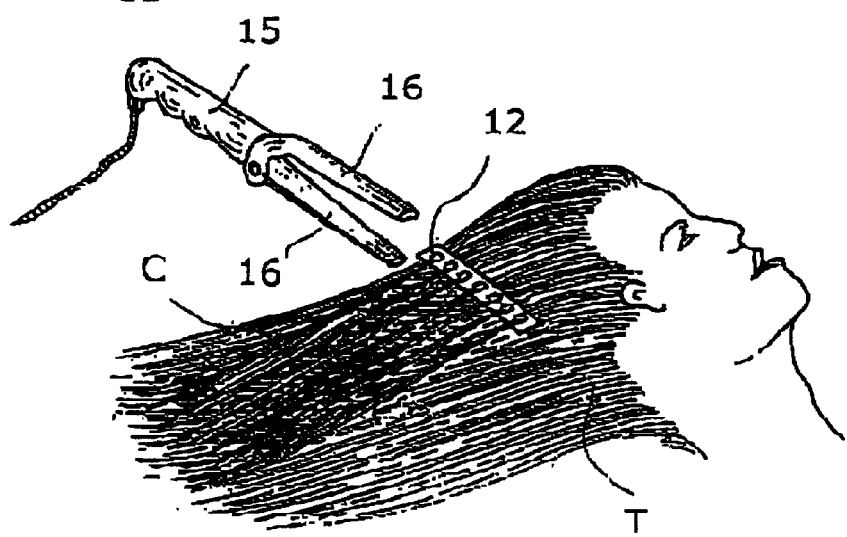
Figure 4:
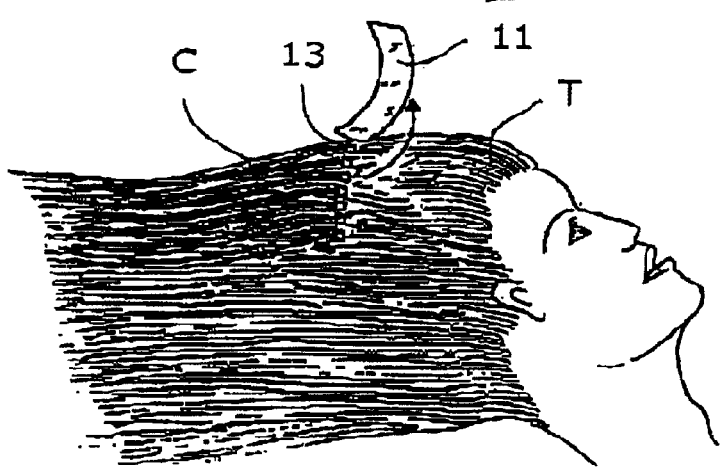
Figure 6:
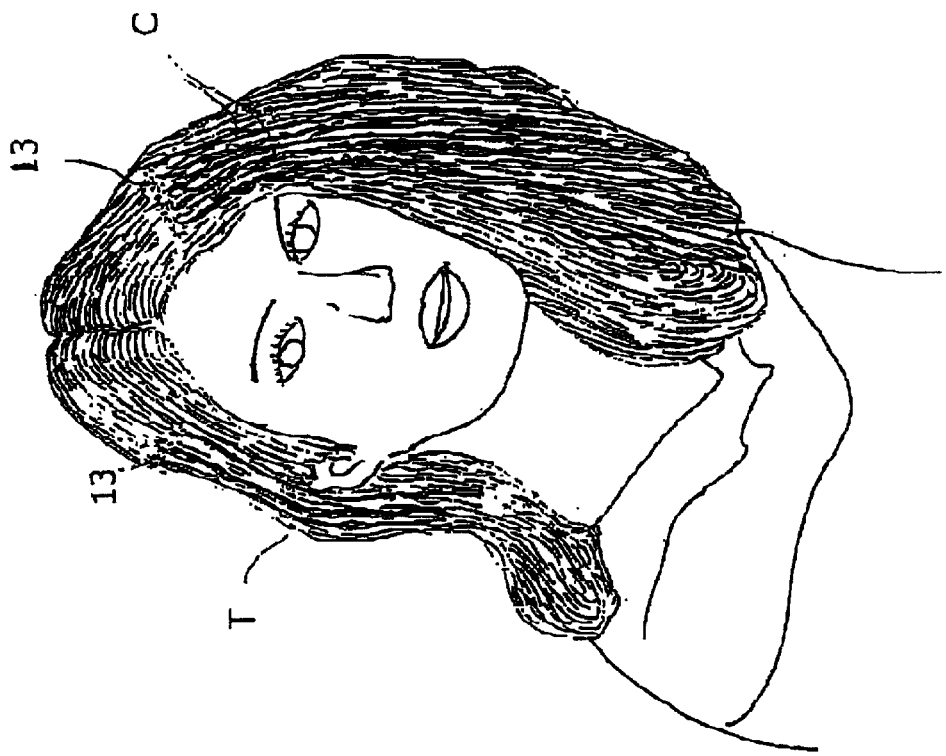
Figure 5:

In the current implementation example, the fusing property of thermoplastic material is used. In fact, it is proposed that energy be applied to the fixing elements via the support tape 11. With reference to FIG. 3, a gripper device 15 with two pressure elements 16 is used, elongated sufficiently to apply a uniform pressure along the entire length of the tape 11, compressing the fixing elements 13.

In this context, at least two systems for transmitting energy to the fixing elements 13 can be used. The first proposes the application of heat. For this proposal, the pressure elements 16 are heated in a convenient manner using one or more electrical resistors.

In this case, the heat is transmitted from one side through the tape 11 and from the other directly onto the fixing elements 13. The tape 11, as previously described, is resistant to heat and will not deform nor degrade when in contact with the hot pressure elements 16.

The second system proposes the use of mechanical energy in the form of ultrasonic frequency vibrations, for example in the range between 20 and 60 kHz. In this case, one or both of the pressure elements are connected to a vibrating body, for example, a piezo-electric element subjected to alternating current at the desired frequency and they will transmit these vibrations to the fixing elements 13 both directly and through the tape 11.

In this case, note that the application of vibrations allows the molecules of the fixing element 13 thermoplastic material to flow easily between the individual hairs of the extension C and the head hair T, penetrating and joining them together.

Note also that, thanks to the efficiency with which the molecules distribute themselves around the hairs in subtle layers, only a minimum quantity of thermoplastic material is necessary to implement the fixing.

In addition, without any source of heat, the immediate solidification when vibrations cease and the impossibility of molten thermoplastic material falling between the hairs or on the head of the user are all important added advantages.

In all cases, the presence of tape 11 and the fact that it is compressed against the hairs together with the fixing elements 13 means that the thermoplastic material remains in position and forms connections with very small dimensions.

In addition, the presence of tape 11 means that additional covers for protecting the user are not required. Once this connection phase is complete, tape 11 can be removed without leaving any glue on the hairs (FIG. 5), to complete the operation.

In the case where the fixing elements are not made of thermoplastic material, the means of connection are activated using the systems described above.

Where the means of connections comprises portions of thermoplastic material positioned in order on a suitable tape and destined to be joined with their respective fixing elements 13 of the extensions C, the aforesaid tape can be applied after the support tape 11 with the extensions C has been positioned on the hair of the user.

The operator can easily superimpose the fixing elements 13 on the portions of thermoplastic material, conveniently positioning the tapes that can be removed and attached as necessary.

Once in position, the tapes can be compressed together by means of a gripper unit 15, placing the tapes between the heated or vibrating pressure elements 16.

In all cases, the two tapes contain the thermoplastic material, which adheres to the fixing elements and mixes with the hair of the user, connecting the respective extensions C to the head hair T.

It is proposed that the dimensions of the fixing element and the portion of thermoplastic material can be reduced as required, without substantially influencing the capacity of the extensions of the assembly 12 of being connected to the respective head hairs.

The considerations and variants of the application methods given above can be applied to the examples of assemblies produced as shown in FIGS. 7 to 12, which represent a single portion of the assembly 12, which is repeated.

Figure 7:
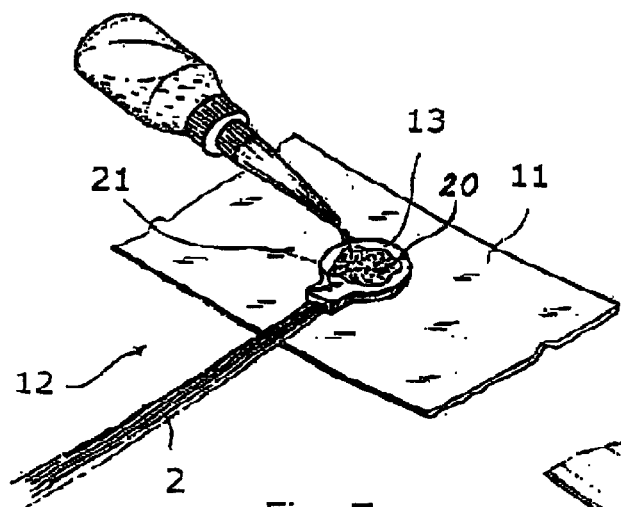
FIGS. 7 to 12 illustrate six additional examples of creating the assemblies of the preceding figures.

With reference to FIG. 7, an assembly 12 is described where the fixing element 13 comprises a rigid or semi-rigid disk, in a non-adhesive and non-thermoplastic material, but resistant to heat and vibration, like a normal plastic. It is intended that the form of a disk is simply an example; a plaque of any suitable form can be a fixing element. Various systems can be used for unifying the fixing element 13 and the respective proximal extremities 2, such as adhesion (gluing or fusion) of a pair of semi elements that hold the hair or by an injection procedure that incorporates the extremities 2.

In this second method of implementation, the element 13 is adhered to the adhesive face 4 of the support tape 11 and the means of connection are represented by a quantity 20 of glue or thermoplastic substances applied directly to the exposed surface 21 of the element 13.

Figure 8:
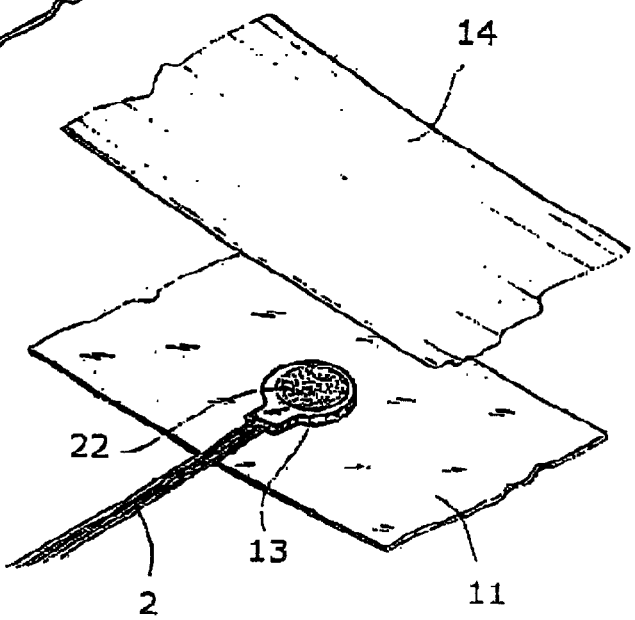

With reference to FIG. 8, a third example of an assembly 12 proposes a fixing element analogous to the preceding example, which is repeated in the fourth and fifth example. The second and third example for producing the assembly 12 are adapted by the method described above where the thermoplastic substance of the respective quantities 20, 22 are melted using heat or vibration. It is also proposed that a thermosetting material, semi-fluid and/or plastic at ambient temperature and solid after the application of heat can basically substitute this substance.

The fourth production example (FIG. 9) has a quantity of glue 23 located on the disk-shaped fixing element 13, for example pressure activated, thermally activated or a type that hardens on exposure to air, such as a two-component resin. In the last case, a protective layer 24 that prevents the glue from coming into contact with atmospheric oxygen protects the fixing element 13. The use of the glue means that the use of heat or vibrations is no longer required, as will be indicated, and the application equipment and the respective pressure devices serve to position the support tape 11 and the extensions C.

Figure 9:
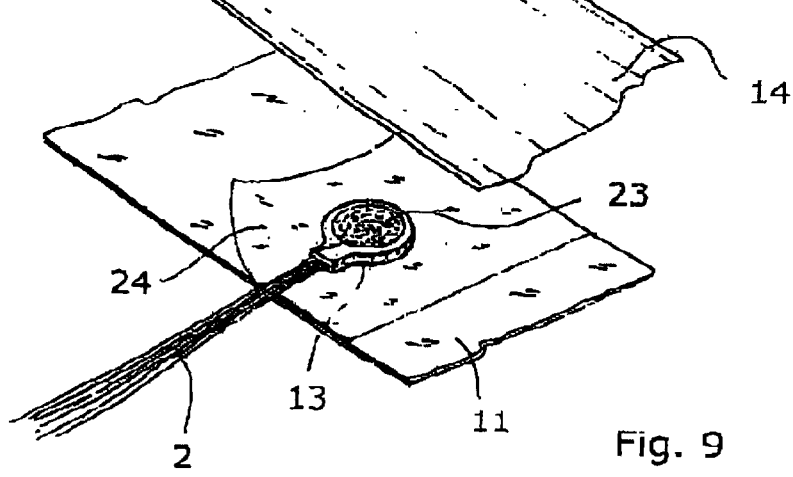
Figure 10:
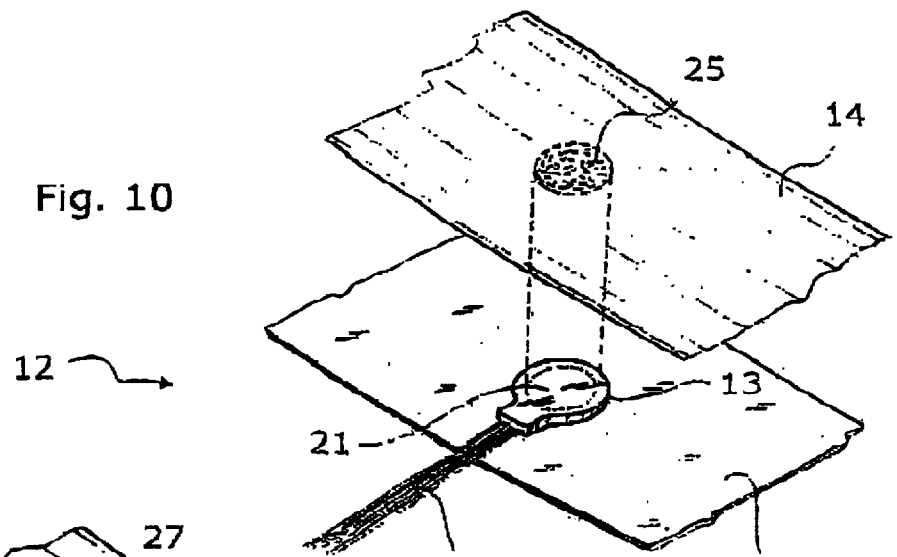

With reference to FIG. 10, a fifth example proposes the use of a fixing element as described in the previous examples and a means of connection comprising an adhesive element 25, glue, thermoplastic or similar substance, arranged in order on the protective tape 14. In this case, the protective tape 14 helps in the application of the extensions C and is applied to the head hair T before the hair-extension connection. In the case where the glue is activated by air, an additional layer of protection is proposed, as shown in FIG. 9 at 24.

Figure 11:
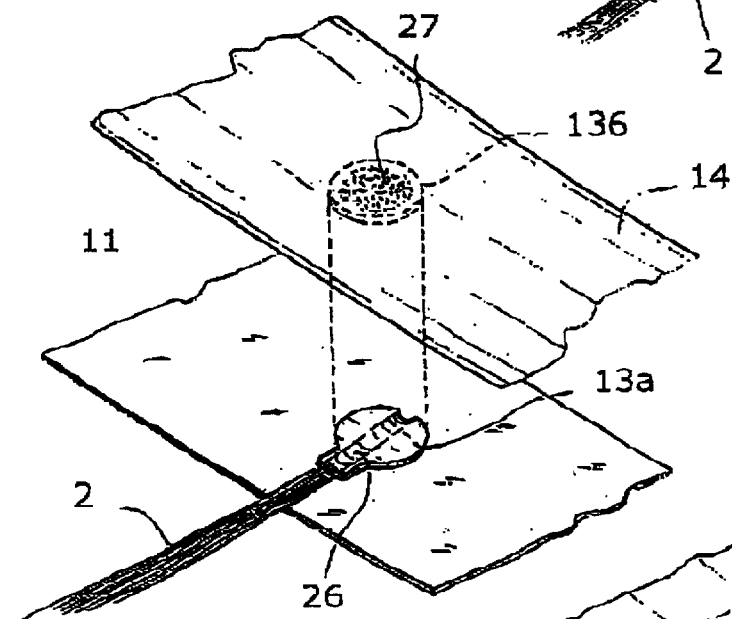
Figure 12:
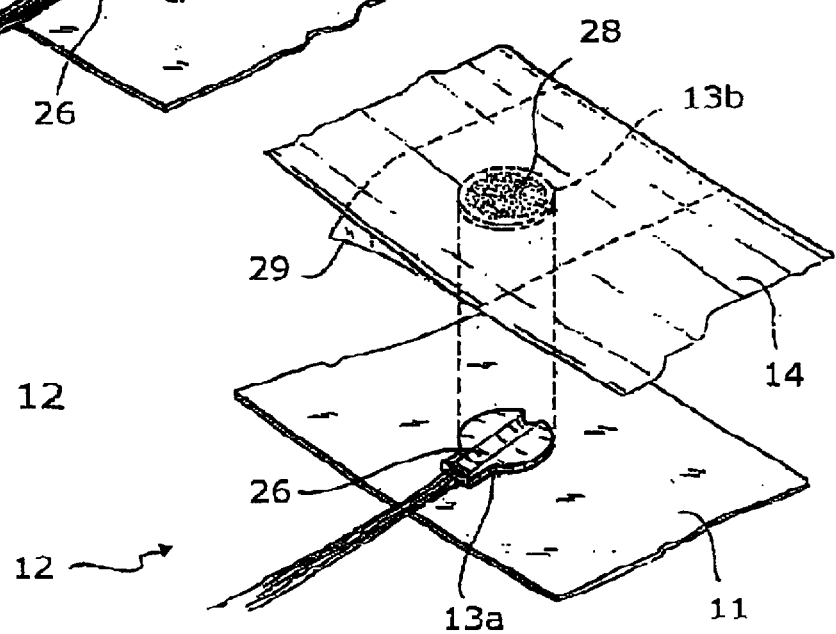

In the sixth and seventh examples of FIG. 11 and FIG. 12, the fixing element 13 comprises a pair of semi elements 13a and 13b, suitable for being attached and trapping the hair of the head T. Finally, the semi elements will include a cavity 26 for holding this hair. A semi element 13a is fixed to the proximal extremity 2 of the extension C while the other 13b is positioned in order on the protective tape 14 and is applied according to the method in the preceding example.

The means of connection comprises a thermoplastic substance or glue 28, in particular two-component glue or similar, protected by a suitable protective layer 29.

Figure 13:
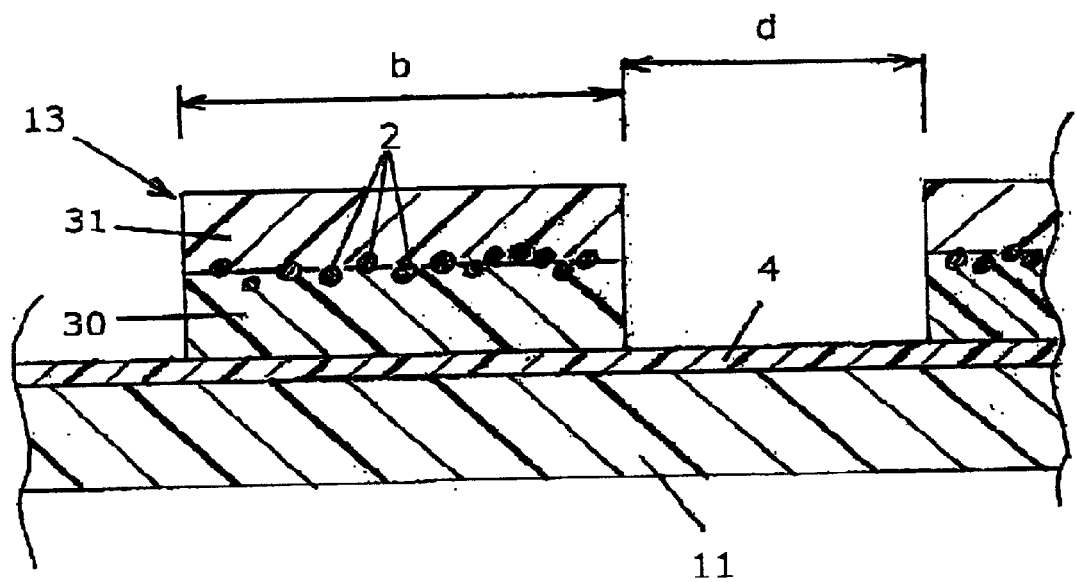
FIG. 13 illustrates a detail of another embodiment of the invention in a sectional view in enlarged scale.

In the embodiment of FIG. 13 the fixing elements 13 comprises two layers 30 and 31 The first layer 30 is fixed to the adhesive face 4 of the support tape 11. The hairs 3 are sandwiched mainly between the first layer 30 and the second layer 31. The second layer 31 has a lower melting point than the first layer 30 so that upon application of heat or ultrasonic energy only the second layer 31 will get soft to establish the connection with head hair. The distance d between the fixing elements 13 may be chosen appropriately as 1 mm to 3 mm. In the same order of magnitude is the width b of the fixing elements 13.

The assemblies may be produced by hand by fixing the extensions on the support tape, but it is preferred to use machines for production.

Figure 14:
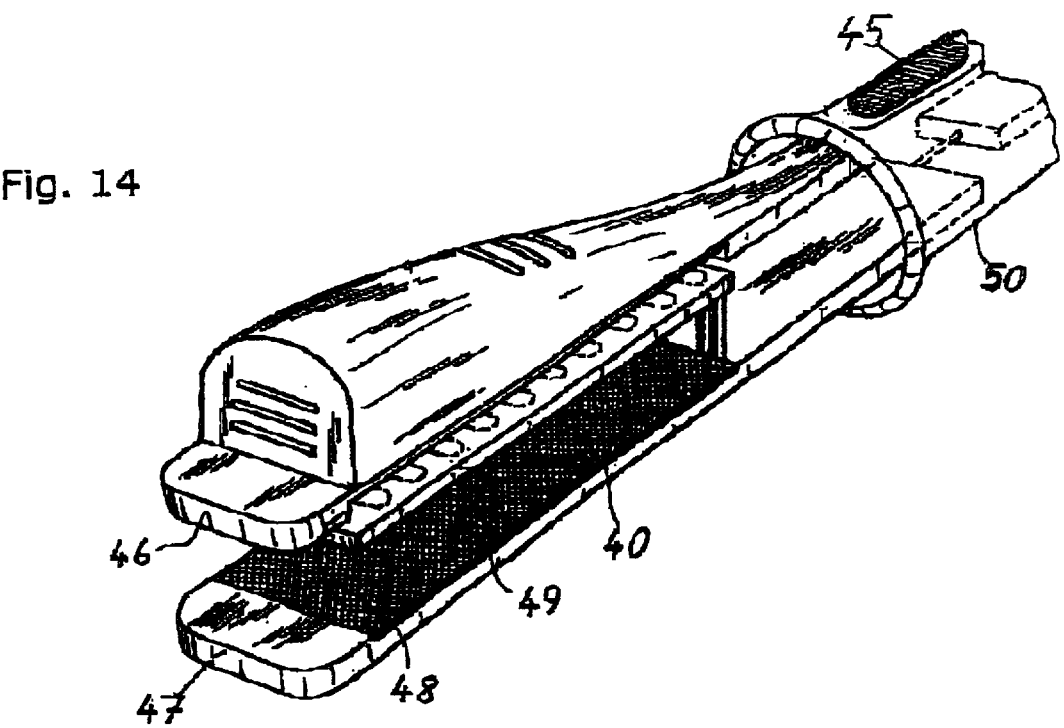
FIG. 14 illustrates a gripper device used for the method of the invention in a perspective view.
Figure 15:
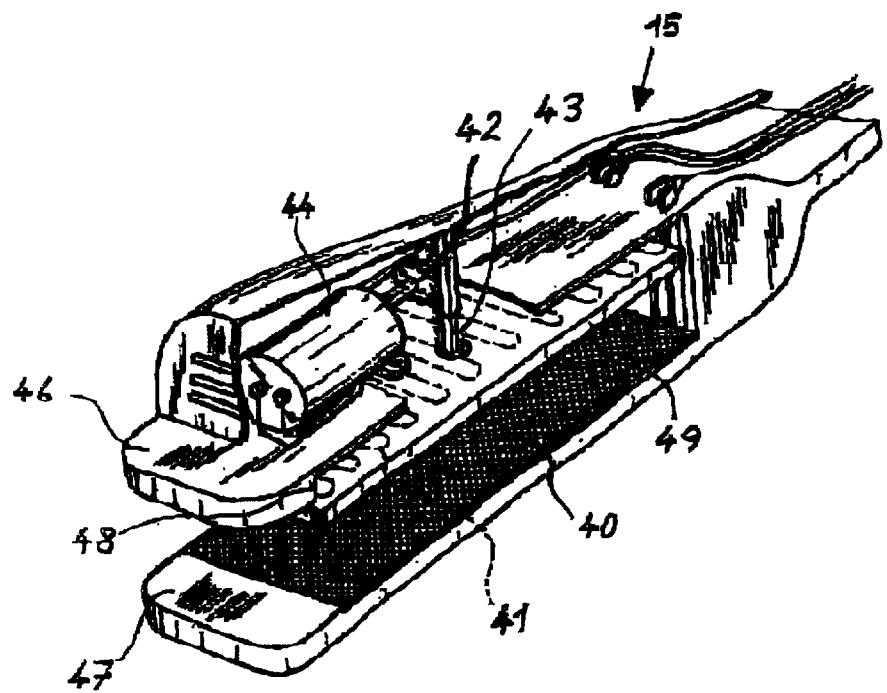
FIG. 15 illustrates the gripper device of FIG. 14 with some parts broken away for better understanding the function.

FIGS. 14 and 15 show a preferred embodiment of a gripper device 15 for use in the method of the invention and which may form part of a system for use in increasing hair length or volume. The gripper device 15 comprises a handle 50 from which two jaws 46, 47 protrude. The first jaw 46 has a recess 48 in which a pressure element 49 is held. The fixed jaw 47 has a contact surface 40 made of resilient material to obtain uniform pressure for all extensions.

The pressure element 49 can be heated by serpentine thermistors 41 to activate the connection means. The pressure element 49 is driven by a rod 43 which is engaged to a pinion 42 driven by an electric motor 44. The pressure element 49 is pivotable with respect to the rod 43 to be able to adapt to extensions having different thickness. Alternatively the pressure element may be driven by hydraulic or pneumatic cylinders.

The movement of the pressure element 49 can be controlled by an actuating button 45. The temperature of the thermistors 41, the pressure applied by the pressure element 49 and other parameters are controlled by a programmable control unit connected with the gripper device 15.

From the description, it is proposed that this method of hair extension does not require any manipulation on the part of the operator and enables the formation of extension-hair connections with very small dimensions, considering that the pressure elements, with the presence of at least one tape, contain the material that enables the connection to occur. The resulting connections are very subtle, with finished edges, almost imperceptible. The only manual intervention is based on manipulating the device that is used to activate the connection.

The dimensions of the connection are not subordinate to the fact that the thermoplastic material and the hair of the extension must forcibly surround the hair of the head hair, creating a connection point whose volume cannot be reduced below a certain limit. For example, in the above-cited Japanese patent, the simple fact that the hair of the extension must be wound around the hair of the head creates in itself a voluminous connection.

According to the current invention, the dimensions of the connection point depend exclusively on the quantity of hair compressed within the extension—the more subtle the extension, the more subtle the connection.

The lack of manipulation therefore leads to the formation of uniform connections. Their optimal quality prevents disconnection due to, for example, penetration of water or other substances.

With this system, it is also possible to hide the extensions within the hair. Then, because it is possible to apply extensions equidistant to each other, additional extensions can be applied between them, with the possibility of obtaining consistent extensions within brief periods and to create complex streaks (highlights) by mixing in extensions with colors different to the hair of the user.

This method reduces the quantity of thermoplastic material used, energy used for activation, no loss of heat and no contamination of the equipment or the connection device. In addition, as can be appreciated, the extension method described above and the related assembly of an extension, due to the possibility of using numerous application variations, allows the professional operator to make maximum use of their imagination.

In addition to the above described methods of adding extensions to hair, assemblies of extensions suitable for being used in the aforesaid method and the procedures for producing those assemblies, a technician in this field can implement numerous additional modifications and variations for the purpose of satisfying additional and complementary requirements, all of which are included within the protected field of the current inventions, as defined in the attached claims.

Especially one skilled in the art will be aware that the shape of the fixing elements 13 may differ from that of the drawings and that the width of these elements may be the same as that of the extensions C or slightly bigger. Further the distance between the extensions C on the tape 11 may be chosen as appropriate.

As is apparent from the foregoing specification, the invention is susceptible of being embodied with various alterations and modifications which may differ particularly from those that have been described in the preceding specification and description. It should be understood that I wish to embody within the scope of the patent warranted thereon all such modifications as reasonably and properly come within the scope of my contribution to the art.

I claim:

1. An assembly for increasing hair volume or length comprising:
   a removable support tape having an adhesive face to be adhered to head hair; and
   a plurality of hair extensions, aligned and substantially parallel to each other, each of them comprising a respective connecting element at the proximal end thereof to be activated for fixing the hair extension to head hair,
   said connecting elements of said plurality of hair extensions being located on the adhesive face of the removable support tape, to retain said hair extensions onto the removable support tape before the activation of said connecting element, said removable support tape being intended to be removed from the head hair after the activation of said connecting element.

2. An assembly according to claim 1, wherein said support tape is transparent.

3. An assembly according to claim 1, wherein the connecting elements are made of a thermoplastic material.

4. An assembly according to claim 3, wherein the thermoplastic material is made of one of a group consisting of polyester and polyamide and polyurethane.

5. An assembly according to claim 1, wherein a protective tape is provided on said support tape to be removed before adhering the support tape to the head hair.

6. An assembly according to claim 1, wherein the support tape is resistant to heat.

7. An assembly according to claim 1, wherein the connecting elements include decorative elements.

8. An assembly according to claim 1, wherein the adhesive face of the support tape is based upon an adhesive of a non-permanent and revisable type operated by pressure and with an adhesive force on the support tape greater than that produced on the connecting elements.

9. An assembly according to claim 1, wherein the connecting elements comprise an adhesive substance comprised of one of the group consisting of thermoplastic material, thermosetting material, heat-activated glues and glues activated by exposure to air.

10. An assembly according to claim 1, wherein the connecting elements are arranged along a straight line with spaces between them on the support tape.

11. An assembly according to claim 1 wherein the connecting elements and the hair have the same color.

12. An assembly according to claim 1, wherein the connecting elements comprises plates having at least layers of plastic with different melting points.

13. A system for use in increasing hair volume or length, comprising:
    a removable support tape having an adhesive face to be adhered to head hair;
    a plurality of hair extensions, aligned and substantially parallel to each other, each of them comprising a respective connecting element at the proximal end thereof to be activated for fixing the hair extensions to head hair, said connecting elements being located on the adhesive face of the removable support tape to retain said hair extensions onto the removable support tape before the activation of said connecting element; and
    a gripper device for applying, when said removable support tape is positioned onto the head hair, at least one of mechanical energy, heat and ultrasonic energy via at least one of two pressure elements which are elongated to apply a uniform pressure along a length of the tape on each of said connecting elements, whereby the connecting elements are activated, said removable support tape being intended to be removed from the head hair after the activation of said connecting element.

14. An assembly for increasing hair volume or length comprising:

a removable support tape having an adhesive face to be adhered to head hair;

a plurality of hair extensions, aligned and substantially parallel to each other, each of them comprising a respective connecting element at the proximal end thereof to be activated for fixing the hair extensions to head hair, said connecting elements being located on the adhesive face of the removable support tape to retain said hair extensions onto the removable support tape before the activation of said connecting element; and means for activating said connecting elements when said removable support tape is positioned onto the head hair, said removable support tape being intended to be removed from the head hair after the activation of said connecting element.

15. An assembly for increasing hair volume or length comprising:

a support tape having an adhesive face;

a plurality of extensions, comprising several hairs, which are connected by a respective connecting element, said extensions being aligned and substantially parallel to each other, each of said connecting elements being located on the support tape at said adhesive face; and activating means associated with said connecting elements to connect the extensions to head hair;

the connecting elements comprising plates having at least layers with different melting points.

* * * * *